Figure 1:
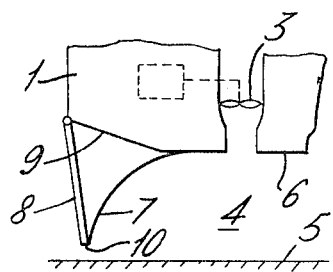

Dec. 13, 1966   F. K. DRIVER   3,291,240
AIR CUSHION VEHICLES HAVING DEFLECTABLE
WALL STRUCTURES
Filed July 1, 1964   2 Sheets-Sheet 1

INVENTOR
F. K. DRIVER
BY
Cameron, Kerkam & Sutton
ATTORNEYS

Dec. 13, 1966   F. K. DRIVER   3,291,240
AIR CUSHION VEHICLES HAVING DEFLECTABLE
WALL STRUCTURES
Filed July 1, 1964   2 Sheets-Sheet 2
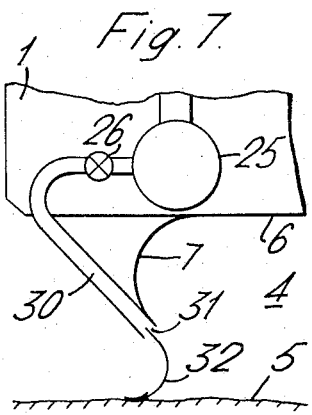
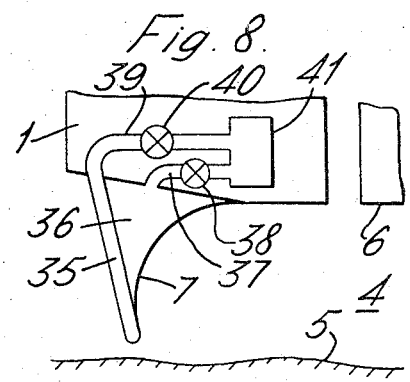
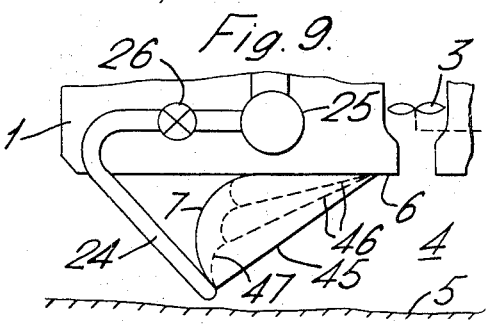
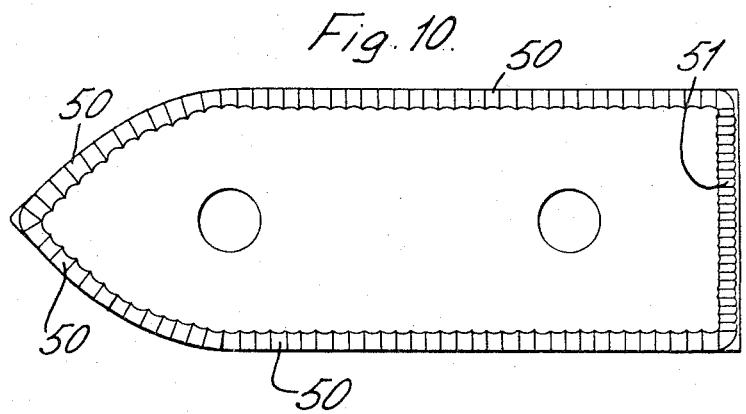
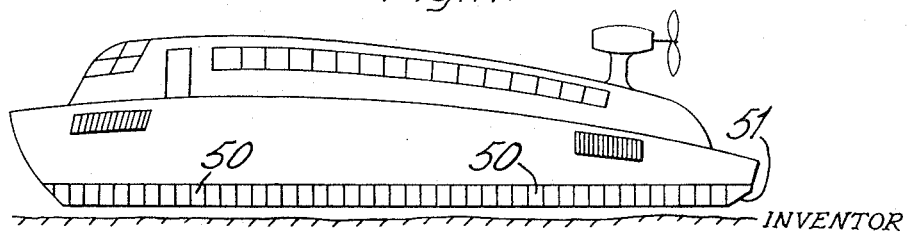
INVENTOR
F. K. DRIVER
BY
Cameron, Kerkam & Sutton
ATTORNEYS United States Patent Office 3,291,240
Patented Dec. 13, 1966

3,291,240
AIR CUSHION VEHICLES HAVING DEFLECTABLE WALL STRUCTURES
Frederick Kenneth Driver, Lymington, England, assignor to Hovercraft Development Limited, London, England, a company of Great Britain
Filed July 1, 1964, Ser. No. 379,462
Claims priority, application Great Britain, July 31, 1963, 30,449/63
12 Claims. (Cl. 180—7)

This invention relates to vehicles which, in operation, are supported above a surface, at least in part, by a cushion of pressurised gas formed and contained beneath the vehicle.

It has been proposed to contain the cushion, for at least part of its periphery, by a downwardly extending wall, or a plurality of such walls and the present invention is particularly concerned with structures for such walls.

Rigid non-deflectable walls can be used but are generally restricted to vehicles operating over water surfaces. Whilst such walls can be of very simple construction there is a disadvantage in that they must generally be limited to being positioned in a fore and aft direction and variations in the level of the water surface, relative to the bottom surface of the vehicle body, either increases the immersion of the walls, or results in immersion of the walls. Such immersion or increase in immersion increases the drag of the vehicle. Further, considerable loads are liable to be imposed on the walls and such loads can be transmitted to the vehicle.

Flexible walls can also be used. These can be used over both land and water surfaces, and are not restricted to being positioned in a fore and aft direction. They can be deflected very readily and can be provided with means to provide a restoring force tending to return the wall quickly to the normal non-deflected position. However, such walls are liable to damage during operation and any attempt to strengthen the walls to protect them against damage reduces their flexibility.

The wall structures according to the present invention are a compromise in that the cushion is contained by a light very flexible member which is supported, and protected, by a rigid or stiff member, or series of such members, which are readily deflectable. The construction provides a construction which tends to maintain the wall at a stabilised position under the action of the cushion pressure.

According to the invention there is provided a vehicle for operating over a surface and which, in operation, is supported above that surface, at least in part, by a cushion of pressurised gas formed and contained in a space beneath the vehicle, in which the space is bounded for at least part of its periphery by a deflectable wall structure comprising, a flexible diaphragm extending downwardly from the bottom surface of the vehicle body at the periphery of the cushion space to contain said cushion and at least one strut extending between the bottom surface of the vehicle body and the lower edge of the diaphragm, outboard of the diaphragm, at least part of the strut being deflectable relative to the vehicle.

The strut may extend continuously for the extent of the diaphragm, or a series of separate struts may be provided, being either immediately adjacent to one another or spaced apart. The struts can be of rigid construction, or of a flexible construction. In all arrangements, the strut acts to locate the lower edge of the diaphragm and hold it in position against the cushion pressure.

Provision can be made for causing a flow of fluid to issue from the bottom of the structure to form a curtain of moving fluid.

Figure 2:
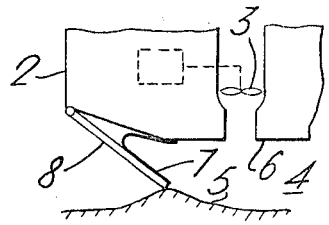
Figure 3:
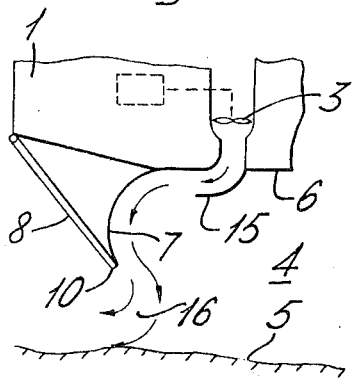
Figure 4:
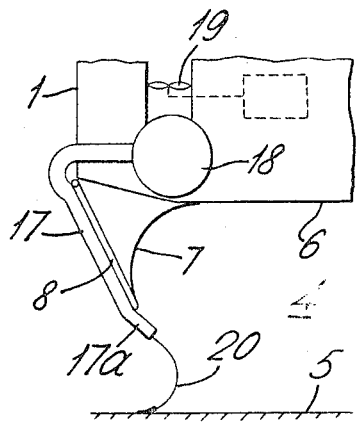
Figure 5:
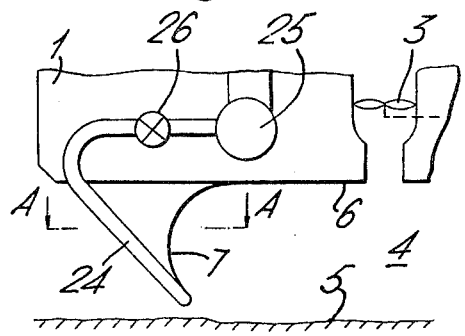
Figure 6:
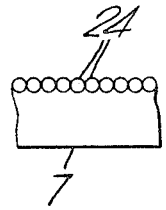

The invention will now be described by way of example, with reference to the accompanying diagrammatic drawings in which:

FIGURE 1 is a vertical section through part of a structure and wall illustrating one embodiment of the present invention, in its normal position, FIGURE 2 is a view similar to FIGURE 1 but showing the wall structure in a position taken up upon impact with the surface, FIGURE 3 is a view similar to FIGURE 1, illustrating another embodiment of the invention, FIGURE 4 is a further view similar to FIGURE 1 illustrating a further embodiment, FIGURE 5 is another view similar to FIGURE 1 illustrating yet another embodiment, FIGURE 6 is a section on the line A—A in FIGURE 5, FIGURE 7 is another view similar to FIGURE 1 illustrating a further embodiment, FIGURE 8 is a further view similar to FIGURE 1, illustrating another embodiment, FIGURE 9 illustrates a modification of the embodiment illustrated in FIGURE 5, FIGURE 10 is an inverted plan view of a vehicle embodying the invention, and FIGURE 11 is a side view of the vehicle in FIGURE 10.

FIGURE 1 illustrates a wall structure for a vehicle 1, of the so-called plenum chamber type. The vehicle is supported clear of the surface by a gaseous cushion comprising air drawn in through intakes (not shown) by propellers 3 and fed to the space 4 defined by the surface 5, the bottom surface 6 of the vehicle 1 and a wall structure comprising a flexible diaphragm-like member 7, hanging from the bottom surface 6 and extending the full height of the wall structure, and struts 8. An extension 9 of the bottom surface 6 slopes slightly upwards, and the struts 8, in the form of rods capable of resisting compression, are pivotally attached at intervals along the extension 9. The lower ends 10 of the struts 8 are attached to the lower edge of the diaphragm 7 and act as compression members to hold the lower edge of the diaphragm in a downward position against the pressure of the cushion. Normally the diaphragm 7 may take up an outwardly convex, inwardly concave curved shape as indicated in FIGURE 1, under the action of the cushion pressure in the space 4, and will tend to maintain the wall structure in a stable position. In this position, in the present example, the lowest part of the diaphragm 7 stands practically vertical, and further from the centre of the cushion than the upper parts. It will be evident that, in order for the diaphragm to assume the shape illustrated in FIGURE 1, the space outboard, i.e., on the convex side, of the diaphragm 7 must be at a pressure less than the cushion pressure.

Should the structure meet the surface, the struts 8 will pivot upwards and the diaphragm 7 will be squeezed up into the angle between the struts 8 and the extension 9, rolling upwardly on the inner faces of the struts, as shown in FIGURE 2. The cushion pressure therefore exerts a steadily increasing force upon the struts 8 through the medium of those portions of the diaphragm which come into contact with the struts, tending to pivot them down again as soon as the vehicle and surface move apart.

Because the extension 9 is angled slightly relative to the bottom surface 6, and, as shown, is of less length than struts 8, the cushion will exert a restoring force upon the lower ends of the struts 8 even if impact with the surface 5 pivots them until they lie flush with the extension 9.

Euler struts or other forms of compression members could be substituted for the rods forming the struts 8.

In FIGURE 3 parts similar to those already described with reference to FIGURES 1 and 2 are given similar references. In this example, the air from the propellers 3 emerges from nozzles 15 immediately below the bottom surface 6. The high pressure air flows outwards towards the diaphragm 7, flowing down the concave surface of the diaphragm, most of the air emerging at the bottom to form a gaseous curtain 16. After formation of the cushion, the gaseous curtain is deflected round and outwards, as shown. It will also be seen that the struts are stabilised in a more inclined position. The struts can be more vertical, as in FIGURE 1, and also the struts 8 in FIGURE 1 can be more inclined, as in FIGURE 3.

FIGURE 4 illustrates an alternative construction for a wall structure provided with means for generating a curtain of high-pressure fluid to bridge the gap between the surface and the bottom of the wall structure. The struts 8 are closely spaced, and a duct 17 of dog-legged shape is attached to each strut. The ducts 17 communicate via a supply duct 18 fed with high-pressure gas by propellers 19. The upper part of the duct 17 is equal in length to the strut 8. The lower part 17a is angled inwards so that the fluid issues from the duct with an increased component of motion inwards. The gas issues from the bottoms of the ducts 17 to form a gaseous curtain 20.

In FIGURES 5 and 6 inflatable sealed tubes 24 are substituted for the strut-forming rods 8 of FIGURES 1 to 4. The upper ends of these tubes depend from the bottom surface 6 of the vehicle 1 where they communicate with a supply duct 25 by way of a valve 26, by means of which the inflation and so the rigidity of the tubes can be varied. When inflated, the tubes act as compression members, or struts, and withstand the normal compressive force exerted upon them by the diaphragm 7. In a similar construction shown in FIGURE 7 open ended tubes 30 are provided, orifices 31 formed in the bottoms of the tubes facing somewhat towards the interior of the cushion space. The fluid escaping from the orifices 31 forms a curtain 32, and both the strength of this curtain and the rigidity of the tubes 30 may be varied by operation of the valve 26.

FIGURE 8 illustrates a further example, in which sealed tubes 35 are used as the struts, as in FIGURE 5, but the tubes 35 are connected for example by webs. By this means a closed space 36 is formed between the diaphragm 7 and the tubes 35. Air is fed to the space 36 via a duct 37 from a suitable source. The pressure of the air in the space 36 can be controlled, if desired, by a valve 38 but obviously must be maintained below the cushion pressure in space 4 so that the diaphragm 7 may normally assume the shape shown in FIGURE 8, and may roll upwardly over the inner faces of the strut tubes 35 when the lower ends of the latter come into contact with the surface 5, similarly to FIGURE 2. Air is fed to the tubes 35 via a duct 39, and the inflation pressure of the tubes can also be controlled, if desired, by a valve 40. There can be a common source for the supply of air to the ducts 37 and 39 such as duct 41. By varying the pressure in the space 36, both the initial inclination of the tubes 35 can be varied and also the deflectability of the tubes and the return force acting on them. Such an arrangement can also be used where a fluid curtain is formed below the wall structure. The control and variation of the pressure in a closed space between the struts and the diaphragm can be provided for other forms of construction.

The downward deflection of the wall structure can be limited by providing one or more series of ties between the diaphragm 7 and the bottom surface 6, as illustrated in FIGURE 9. This figure illustrates a modification of the example illustrated in FIGURE 5. A series of ties 45 extend between the lower end of the diaphragm 7 and the bottom surface of the vehicle. Further ties can be provided, as indicated by the dotted lines 46, in which case the diaphragm will adopt a profile as indicated by the dotted line 47. This will vary the return or restoring effect of the cushion pressure on the tubes 24 when they are deflected.

In FIGURES 10 and 11 is shown a ground effect vehicle in which wall structures 50 according to this invention are used to bound the cushion space at the front and sides, for example of the form illustrated in FIGURE 5. At the rear the cushion space is bounded by a flexible wall comprising a series of members 51. Each of these is formed of a single sheet of flexible material, folded to form a channel shaped cross-section when viewed from above or below and a triangular shape when viewed in elevation. The sides of each member are in contact to provide a seal for the cushion. Typical constructions of such members are described and illustrated in the commonly-owned copending application of Denyl Stanley Bliss, Serial No. 267,695, filed March 25, 1963.

Should a vehicle with side walls according to this invention travel over water, the bottom edges of those walls may dip into the water and help to maintain the directional stability of the vehicle under normal conditions, without undue drag, since the area they present in front elevation is small. Should the vehicle need to yaw, the walls may be arranged to yield and clear the surface temporarily.

Embodiments of the invention described above can be used as walls extending in a generally fore and aft direction and acting to sub-divide the space occupied by the cushion of pressurised gas. Again, construction according to the invention, similar to the embodiments described above, can also be used for walls extending across a vehicle, and acting to sub-divide the cushion space.

It will be appreciated that constructions using rigid or very stiff struts, as in FIGURES 1 to 4, will deflect inwards towards the cushion very readily but outwards deflection is not so readily obtained. Such constructions are thus less suitable for use at the rear of the vehicle, construction using more flexible struts, such as the inflatable tubes of FIGURES 5 to 9, being more suitable. Alternately, if rigid or very stiff struts are desired, a spring loaded hinge or the like can be provided at an intermediate position in each strut, the hinge being arranged so that the strut folds inwards towards the cushion space at that position, allowing the lower part of the strut to pivot outwards away from the cushion space.

I claim:
1. A vehicle for operating over a surface and which, in operation, is supported above that surface, at least in part, by a cushion of pressurised gas formed and contained in a space beneath the vehicle, in which the space is bounded for at least part of its periphery by a deflectable wall structure comprising a flexible diaphragm extending downwardly from the bottom surface of the vehicle at the periphery of the cushion space for the full height of the wall structure to contain said cushion, and a series of struts extending between the bottom surface of the vehicle and the lower edge of the diaphragm, outboard of the diaphragm and outside the cushion space, and having their lower ends connected to the lower edge of the diaphragm to hold the diaphragm in position against the cushion pressure, each strut being normally inclined downwardly and inwards towards the cushion space and at least part of each strut being deflectable relative to the vehicle upon contact of the strut with the surface over which the vehicle is operating, the outboard surface of the diaphragm being exposed to a pressure less than the pressure in the cushion space, whereby the diaphragm normally assumes an outwardly convex curved shape and rolls upwardly over the inboard faces of the struts when the struts are deflected inwards towards the cushion space, the cushion pressure exerted against the rolled up portion of the diaphragm acting to deflect the struts outwardly towards their normal positions.

2. A vehicle as claimed in claim 1 wherein the struts are of rigid construction, spaced apart along the length extended by the diaphragm and pivotally connected at their upper ends to the vehicle body.

3. A vehicle as claimed in claim 1 wherein a tie extends inwardly and upwardly between the lower part of the wall structure and the bottom surface of the vehicle.

4. A vehicle as claimed in claim 1 wherein means are provided for causing a gas to issue from the bottom of the wall structure to form a curtain of moving gas which assists in containing the cushion of pressurised gas.

5. A vehicle in claim 4 wherein means are provided for causing a gas to flow down the surface of the diaphragm adjacent to the cushion space to issue from the bottom of the wall structure to form the said curtain.

6. A vehicle for operating over a surface and which, in operation, is supported above that surface, at least in part, by a cushion of pressurised gas formed and contained in a space beneath the vehicle, in which the space is bounded for at least part of its periphery by a deflectable wall structure comprising a flexible diaphragm extending downwardly from the bottom surface of the vehicle at the periphery of the cushion space for the full height of the wall structure to contain said cushion, and a series of struts in the form of flexible inflated tubes extending between the bottom surface of the vehicle body and the lower edge of the diaphragm, outboard of the diaphragm and outside the cushion space, and having their lower ends connected to the lower edge of the diaphragm to hold the diaphragm in position against the cushion pressure, each strut being normally inclined downwardly and inwards towards the cushion space and at least part of each strut being deflectable relative to the vehicle upon contact of the strut with the surface over which the vehicle is operating, the outboard surface of the diaphragm being exposed to a pressure less than the pressure in the cushion space, whereby the diaphragm normally assumes an outwardly convex curved shape and rolls upwardly over the inboard faces of the struts when the struts are deflected inwards towards the cushion space, the cushion pressure exerted against the rolled up portion of the diaphragm acting to deflect the struts outwardly towards their normal positions.

7. A vehicle as claimed in claim 6 wherein the tubes are spaced apart along the length extended by the diaphragm.

8. A vehicle as claimed in claim 7 including a flexible gas-tight web extending between each adjacent pair of struts to form, with the diaphragm and the bottom surface of the vehicle, a closed space containing a gas under pressure.

9. A vehicle as claimed in claim 8 wherein means are provided for controlling the pressure in said closed space.

10. A vehicle as claimed in claim 6 wherein a port is formed in the bottom of each tube, whereby the fluid supplied to inflate the tubes can issue from the ports to form a curtain of moving gas which assists in containing the cushion of pressurised gas.

11. A vehicle for operating over a surface and which, in operation, is supported above that surface, at least in part, by a cushion of pressurised gas formed and contained in a space beneath the vehicle, wherein the cushion space is bounded along each side of the vehicle by a wall depending from the bottom surface of the vehicle, at least one deflectable wall structure extending between the walls at the front of the vehicle, and at least one deflectable wall structure extending between the walls at the rear of the vehicle, each of said wall structures comprising a flexible diaphragm extending downwardly from the bottom surface of the vehicle at the periphery of the cushion space for the full height of the wall structure to contain said cushion, and a series of struts extending between the bottom surface of the vehicle body and the lower edge of the diaphragm, outboard of the diaphragm and outside the cushion space, and having their lower ends connected to the lower edge of the diaphragm to hold the diaphragm in position against the cushion space, each of said struts being normally inclined downwardly and inwards towards the cushion space and at least part of each strut being deflectable relative to the vehicle upon contact of the strut with the surface over which the vehicle is operating, the outboard surface of the diaphragm being exposed to a pressure less than the pressure in the cushion space, whereby the diaphragm normally assumes an outwardly convex curved shape and rolls upwardly over the inboard faces of the struts when the struts are deflected inwards towards the cushion space, the cushion pressure exerted against the rolled up portion of the diaphragm acting to deflect said struts outwardly towards their normal positions.

12. A vehicle for operating over a surface and which, in operation, is supported above that surface, at least in part, by a cushion of pressurised gas formed and contained in a space beneath the vehicle, in which the space is bounded for at least part of its periphery by a deflectable wall structure comprising a flexible diaphragm extending downwardly from the bottom surface of the vehicle at the periphery of the cushion space to contain said cushion, a plurality of struts extending between the bottom surface of the vehicle body and the lower edge of the diaphragm, outboard of the diaphragm, said struts being spaced apart along the peripheral extent of the diaphragm and having their lower ends connected to the lower edges of the diaphragm, each of said struts being in the form of a flexible tube, means for inflating said tubes to a pressure sufficient to enable the tubes to act as compression members and withstand the normal compressive force exerted thereon by the diaphragm, a flexible gas-tight web extending between each adjacent pair of struts to form, with the diaphragm and the bottom surface of the vehicle, a closed space, and means for so controlling the pressure in said closed space that it is maintained below the pressure in the cushion space, whereby the diaphragm normally assumes an outwardly convex curved shape and rolls upwardly over the inboard faces of the struts when the struts are deflected inwards toward the cushion space by contact with the surface over which the vehicle is operating, the cushion pressure exerted against the rolled up portion of the diaphragm acting to deflect the struts outwardly toward their normal positions.

References Cited by the Examiner

UNITED STATES PATENTS 3,191,705   9/1960   Jones et al. _____ 180—7

FOREIGN PATENTS 1,332,293   6/1963   France.
925,425   5/1963   Great Britain.

BENJAMIN HERSH, *Primary Examiner.*

M. S. SALES, *Assistant Examiner.*